(12) United States Patent
Codilian et al.

(10) Patent No.: US 6,628,473 B1
(45) Date of Patent: Sep. 30, 2003

(54) MOBILE DEVICE HAVING DISK DRIVE INCLUDING A DATA STORAGE ZONE WITH A DATA TRACK PITCH CONFIGURED FOR USE IN A MOBILE ENVIRONMENT

(75) Inventors: Raffi Codilian, Irvine, CA (US); Thomas D. Hanan, Mission Viejo, CA (US); Anil Sareen, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 329 days.

(21) Appl. No.: 09/872,237

(22) Filed: May 31, 2001

(51) Int. Cl.[7] ............................................... G11B 5/012
(52) U.S. Cl. ..................................................... 360/97.01
(58) Field of Search ............................. 360/97.01, 131, 360/135

(56) References Cited

U.S. PATENT DOCUMENTS 6,128,272 A * 10/2000 Horimai et al. .......... 369/44.26

* cited by examiner

*Primary Examiner*—George J. Letscher
(74) *Attorney, Agent, or Firm*—Milad G. Shara, Esq.; Robroy R. Fawcett, Esq.

(57) ABSTRACT

The invention may be embodied in a disk drive for use in a mobile device. The mobile device may be a hand held computing device such as a personal digital assistant (PDA) or a mobile terminal such as a cellular telephone. The mobile device includes a host processor for accessing data on the disk drive. The disk drive has a rotating disk media surface and a moveable read/write head disposed over the media surface. The disk drive includes a first data storage zone on the disk media surface for storing data on first data tracks using a first track pitch, and a second data storage zone on the common disk media surface for storing data on second data tracks using a second data track pitch. The first data track pitch is substantially wider than the second data track pitch.

14 Claims, 3 Drawing Sheets

MOBILE DEVICE HAVING DISK DRIVE INCLUDING A DATA STORAGE ZONE WITH A DATA TRACK PITCH CONFIGURED FOR USE IN A MOBILE ENVIRONMENT

BACKGROUND OF THE INVENTION

1. Field of the Invention

The present invention relates to digital data storage, and more particularly, to a hard disk drive for use in a mobile device.

2. Description of the Prior Art

A hard disk drive provides digital data storage on a magnetic media that is accessed using a flying head that precisely floats over the media. Use of a hard disk drive in a hand-held portable device is generally problematic because the device may be subjected to fairly high shock levels. A shock delivered to the disk drive may cause the head to contact or "slap" the disk media surface or cause the head to move off track and damage adjacent track data during a write operation.

Accordingly, there exists a need for a relatively rugged disk drive for use in a mobile device. The present invention satisfies these needs.

SUMMARY OF THE INVENTION

The present invention may be embodied in a disk drive for use in a mobile device. The mobile device includes a host processor that accesses data on the disk drive. The disk drive has a rotating disk media surface and a moveable read/write head disposed over the disk media surface. The disk media surface is divisible into zones that are radially disposed in discrete areas of the disk media and each zone having a plurality of tracks for storing data. The disk drive includes a first data storage zone on the disk media surface for storing data using a first track pitch, and a second data storage zone on the disk media surface for storing data using a second data track pitch such that the disk media surface is common to the first data storage zone and the second data storage zone. The first data track pitch of the first data storage zone is substantially wider than the second data track pitch of the second data storage zone.

In more detailed features of the invention, a track-to-track spacing of the first track pitch may be about two times wider than a track-to-track spacing of the second track pitch. Alternatively, the track-to-track spacing of the first track pitch is about 30 percent wider than the track-to-track spacing of the second track pitch.

In other more detailed features of the invention, the first data storage zone may include a mobile-safe zone and the second data storage zone may include a mobile-normal zone. The mobile device may access the mobile-normal zone and the mobile safe zone when the mobile device is in a mobile environment or when the mobile device is in a non-mobile environment. The mobile device is in a non-mobile environment when the mobile device is placed in a docking station and the mobile device is in a mobile environment when the mobile device is not placed in the docking station. The disk drive may include a ramp for parking an actuator arm coupled to the read/write head when the disk drive is in a spin-down mode, and the disk drive may include a mobile-low-power data storage zone that is located on the disk media surface so that an actuator current is minimized for moving the read/write head to a data track in the mobile-low-power zone upon loading of the read/write head over the disk media surface from the ramp. A distance from an outer diameter of the disk media surface to the mobile-low-power zone may be between about 10 and 15 percent of a distance between the outer diameter and an inner diameter of the disk media surface

BRIEF DESCRIPTION OF THE DRAWINGS

The accompanying drawings illustrate embodiments of the present invention and, together with the description, serve to explain the principles of the invention.

DETAILED DESCRIPTION

Figure 1:
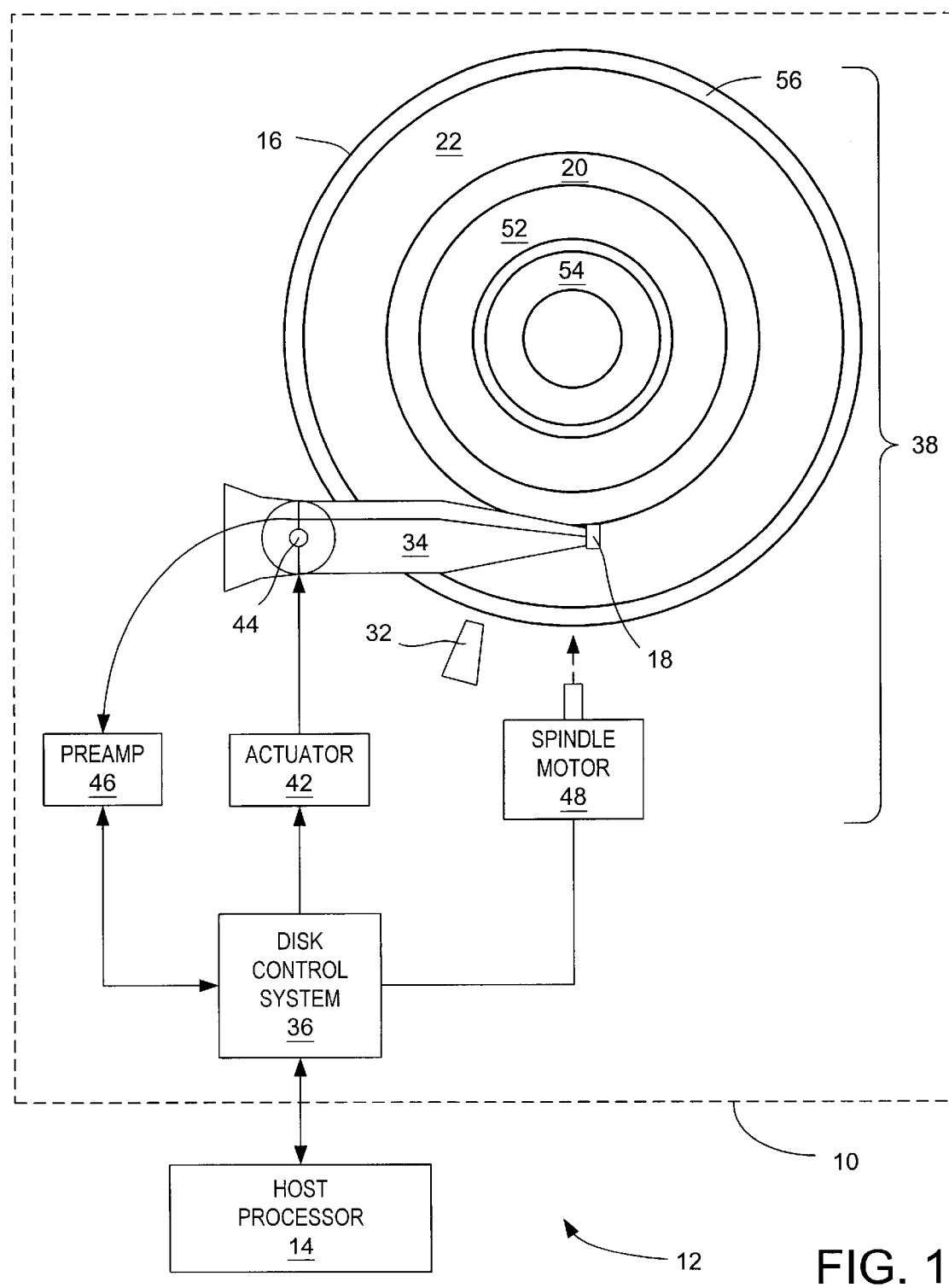
FIG. 1 is a block diagram of a mobile device having a disk drive with a data storage zone that includes a data track pitch configured for use in a mobile environment, according to the present invention.
Figure 2:
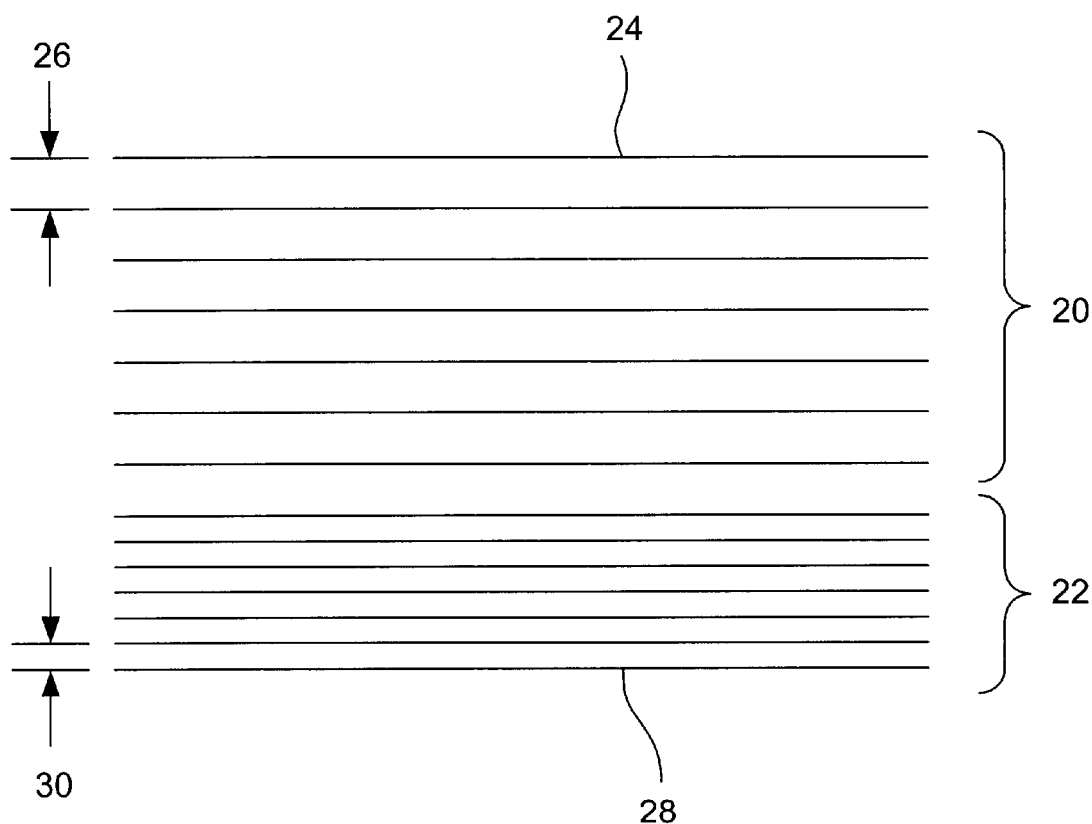
FIG. 2 is a schematic diagram of data storage zones with a data storage zone having a wider track pitch, according to the present invention.

With reference to FIGS. 1 and 2, the present invention may be embodiment disk drive 10 for use in a mobile device 12. The mobile device may be a hand held computing device such as a personal digital assistant (PDA) or a mobile terminal such as a cellular telephone. The mobile device includes a host processor 14 for accessing data on the disk drive. The disk drive 10 has a rotating disk media surface 16 and a moveable read/write head 18 disposed over the disk media surface. The disk media surface is divided into data storage zones that are radially disposed in discrete areas of the disk media surface, and each zone has a plurality of tracks for storing data. The disk drive includes a first data storage zone 20 on the disk media surface for storing data on first data tracks 24 using a first track pitch 26, and a second data storage zone 22 on the common disk media surface for storing data on second data tracks 28 using a second data track pitch 30. The first data track pitch of the first data storage zone is substantially wider than the second data track pitch of the second data storage zone.

In accordance with a wider track pitch 26 in the first data storage zone 20, servo sectors and tracks may be uniformly spaced in the first and second data storage zones and the mobile device 12 may skip data tracks in the first data storage zone to allow the disk drive 10 to more safely write data when in a mobile environment. The skipping of data tracks may be accomplished using a technique disclosed in U.S. Pat. No. 6,462,896 [application Ser. No. 09/728,627 filed Nov. 30, 2000] titled METHOD FOR MINIMIZING ADJACENT TRACK DATA LOSS DURING A WRITE OPERATION IN A DISK DRIVE. U.S. Pat. No. 6,462,896 [application Ser. No. 09/728,627] is incorporated herein in its entirety by reference. The skipped data tracks are not used in the first data storage zone, and the zone is considered full when data is written to all of the widely-spaced data tracks 24. A track-to-track spacing associated with the first track pitch 26 would be about two times wider than a track-to-track spacing associated with the second track pitch 30.

Alternatively, the wider track pitch 26 in the first data storage zone 20 may be accomplished using a disk drive 10 disclosed in U.S. Pat. No. 6,052,250 titled DISK DRIVE WITH SEPARATELY DETERMINED SERVO AND DATA TRACK PITCH. U.S. Pat. No. 6,050,250 is incorporated herein in its entirety by reference. A servo control system in the disk drive may modify certain parameters of its servo algorithms such as adjusting the granularity of analog-to-digital conversions for servo burst patterns to reflect the track spacing, or employing a larger "write unsafe" limit that allows the disk drive to more safely and successfully write data while the device 12 in the mobile environment. The larger write unsafe limit allows for quicker and more certain settling of the head after a seek to the target track. A track-to-track spacing associated with the first track pitch may be at least about 30% to about 50% wider than a track-to-track spacing associated with the second track pitch 30 using the technique disclosed in U.S. Pat. No. 6,050,250.

The wider track pitch 26 of the first data storage zone 20 also may be accomplished by increasing the radial track spacing of the servo sectors in accordance with the increased spacing between the data tracks 24. During initial manufacture of the disk drive 10, the servo sectors in first data storage zone may be written with a wider radial spacing.

The disk drive 30 includes a disk control system 36 and ahead disk assembly (HDA) 38. The HDA includes a magnetic disk having the disk media surface 16 with the plurality of concentric data tracks recorded thereon, the head 18 for writing user data to or reading user data from a selected one of the data tracks in response to host command during a user operation of the disk drive, and an actuator 42 for positioning the head over the selected track. The head in present disk drives comprises a giant magneto-resistive (GMR) read element and thin film inductive write element. The actuator is typically implemented as a voice coil motor (VCM) which rotates an actuator arm 34 about a pivot 44 in order to position the head radially over the disk in response to control signals from the disk control system. The HDA 44 also includes a preamplifier 46 and a spindle motor 48 for rotating the disk. The head communicates with the disk control system via the preamplifier. The disk control system also includes circuitry and processors that provide an intelligent disk control system interface between the host processor 14 and the HDA for execution of read and write commands.

The disk control system 36 implements a servo control loop which causes the head 18 to follow a centerline of the selected track in an operation generally referred to as "track following." During track following, the path of the head wanders about a track centerline. Typically, the disk control system attempts to limit the head wander to within a predetermined range defined by a "Track Misregistration" (TMR) budget.

It should be noted that slight variations in the track-to-track distances across the disk media surface 16 inherently result from the manufacturing tolerances, an arcuate path of the actuator arm 34, and a physical spacing between a read element and a write element in the read/write head 18. The wider track pitch 26 of the first data storage zone 20 is a substantial and purposeful increase over the track pitch 30 of the second data storage zone 22 to provide a more rugged data storage zone in the disk drive 10 for more safe operation in a mobile environment.

The first data storagezone 20 may include a mobile-safe zone and the second data storage zone 22 may include a mobile-normal zone. The disk drive may also include a docked-safe zone 52, an ultra-safe zone 54, and a mobile-low-power zone 56. The mobile device 12 may write data to the docked-safe zone or to the ultra-safe zone only when the mobile device is in a non-mobile environment and not when the mobile device is in a mobile environment. The mobile device may write data to the mobile-normal zone and to the mobile-safe zone when the mobile device is in a mobile environment or when the mobile device is in a non-mobile environment. The mobile device 12 may read data from the mobile-normal zone, the mobile-safe zone, and the docked safe zone when the mobile device is in a mobile environment, but the mobile device may read data from the ultra-safe zone only when the mobile device is in a non-mobile environment and not when the mobile device is in a mobile environment. The disk drive 10 may prevent the moveable read/write head from dwelling or moving over the ultra-safe zone when the device is in a mobile environment. The ultra-safe zone and the docked-safe zone may be separated by a gap.

The disk drive 10 includes a ramp 32 for parking the actuator arm 34 coupled to the read/write head 18 when the disk drive is in a spin-down mode. The mobile-low-power zone 56 may be located on the disk media surface 16 such that an actuator current is minimized for moving the read/write head to a data track in the mobile-low-power zone upon loading of the read/write head over the disk media 16 from the ramp. The mobile-low-power zone may have data read from but may not have data written to it when the mobile device 12 is in a mobile environment. A distance from an outer diameter of the disk media surface to the mobile-low-power zone is between about 10 and 15 percent of a distance between the outer diameter and an inner diameter of the disk media surface.

Figure 3:
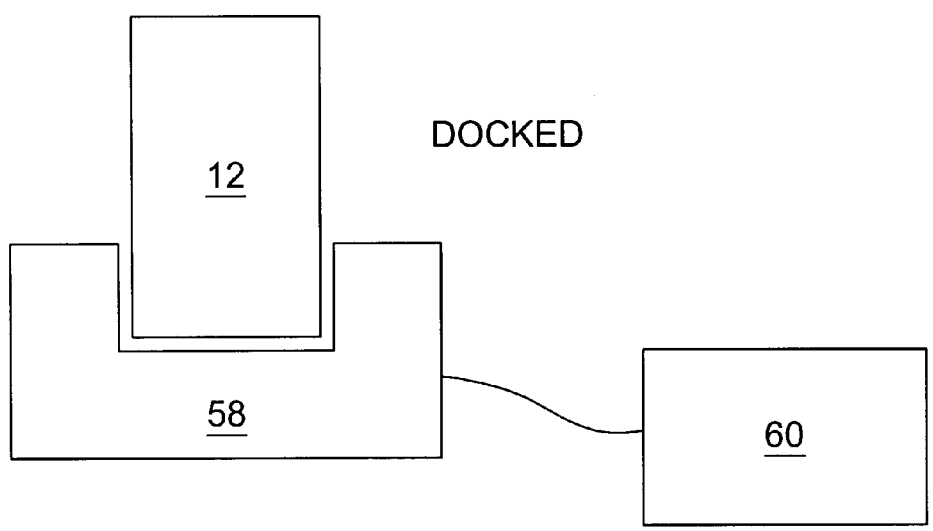
FIG. 3 is a block diagram showing the mobile device of FIG. 1, placed in a docking station that provides a non-mobile environment for the mobile device.
Figure 4:
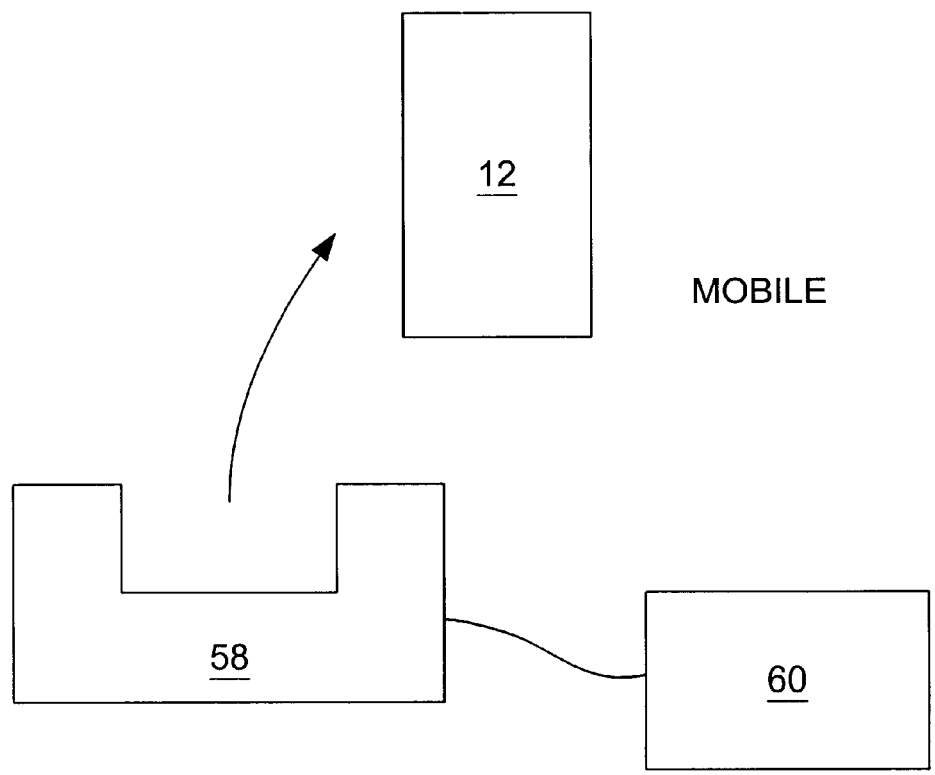
FIG. 4 is a block diagram showing the mobile device of FIG. 1, in a mobile environment removed from the docking station.

With reference to FIGS. 3 and 4, the mobile device 12 is in a non-mobile environment when the mobile device is placed in a docking station 58 that may be coupled to a stationary computer 30 or other computing device (FIG. 3), and is in a mobile environment when the mobile device is removed from the docking station (FIG. 4). The mobile environment can be harsh on the mobile device subjecting it to fairly high shock levels. These high shock levels may affect the integrity of the data stored on the disk drive 10. Accordingly, data requiring a higher level of integrity may be stored in the first data storage zone when the mobile device is in a mobile environment.

Enforcement of rules for accessing data storage zones according to whether the mobile device 12 and the disk drive 10 are in a mobile environment can be implemented in a program executed by the mobile device host processor 14, by a program executed by a disk drive microprocessor within the disk control system 36, or by a combination of both. For example, the disk drive can be manufactured with a program which defines rules for mobile access of specific zones, and the host program can inform the disk drive of whether the environment is mobile or not. This could be determined by a signal from the docking station 58 to the mobile device, or by monitoring a signal indicating the presence of AC power. In another embodiment, the signal can be detected by logic within the disk drive.

It is contemplated that the ultra-safe zone 54 may be relatively small for holding very secure data such as passwords or the like. The data in the ultra-safe zone may be mirrored in the mobile-readable zones for mobile access. The docked-safe zone 52 may be a medium-sized zone for data requiring a relatively high integrity such as schedules, presentations, etc. If changes to data in a docked-safe zone are required in a mobile environment, a copy may be made in a mobile zone, and changed accordingly. When the mobile device 12 is docked, the docked-safe copy may be updated and the mobile copy deleted. The mobile-safe zone of the first data storage zone 20 may be a small-sized zone for holding relatively high integrity data that can be used to update the docked-safe zone when the device is docked. The mobile-normal zone of the second data storage zone 22 may be a large-sized zone for holding data of relatively low important such as data from games or web surfing. The low-power zone 56 may be a small-sized zone for storing data requiring a low amount of energy to access.

We claim:

1. A mobile device comprising a host processor and a disk drive, the disk drive having a rotating disk media surface and a moveable read/write head disposed over the disk media surface, the disk media surface being divisible: into zones that are radially disposed in discrete areas of the disk media, each zone having a plurality of tracks for storing data, the disk drive comprising:

a first data storage zone on the disk media surface for storing data using a first track pitch;

a second data storage zone on the disk media surface for storing data using a second data track pitch such that the disk media surface is common to the first data storage zone and the second data storage zone, wherein the first data track pitch of the first data storage zone is substantially wider than the second data track pitch of the second data storage zone.

2. A mobile device as defined in claim 1, wherein a track-to-track spacing of the first track pitch is about two times wider than a track-to-track spacing of the second track pitch.

3. A mobile device as defined in claim 1, wherein a track-to-track spacing of the first track pitch is about 30 percent wider than a track-to-track spacing of the second track pitch.

4. A mobile device as defined in claim 1, wherein the first data storage zone includes a mobile-safe zone, the second data storage zone includes a mobile-normal zone, and the mobile device may access the mobile-normal zone and the mobile safe zone when the mobile device is in a mobile environment or when the mobile device is in a non-mobile environment.

5. A mobile device as defined in claim 4, wherein the mobile device is in a non-mobile environment when the mobile device is placed in a docking station and the mobile device is in a mobile environment when the mobile device is not placed in a docking station.

6. A mobile device as defined in claim 1, wherein:

the disk drive includes a ramp for parking an actuator arm coupled to the read/write head when the disk drive is in a spin-down mode; and the disk drive includes a mobile-low-power data storage zone that is located on the disk media surface so that an actuator current is minimized for moving the read/write head to a data track in the mobile-low-power zone upon loading-of the read/write head over the disk media surface from the ramp.

7. A mobile device as defined in claim 6, wherein a distance from an outer diameter of the disk media surface to the mobile-low-power zone is between about 10 and 15 percent of a distance between the outer diameter and an inner diameter of the disk media surface.

8. A disk drive for use in a mobile device including a host processor, the disk drive having a rotating disk media and a moveable read/write head disposed over the disk media, the disk media being divisible into zones that are radially disposed in discrete areas of the disk media, each zone having a plurality of tracks for storing data, the disk drive comprising:

a first data storage zone on the disk media surface for storing data using a first track pitch;

a second data storage zone on the disk media surface for storing data using a second data track pitch such that the disk media surface is common to the first data storage zone and the second data storage zone, wherein the first data track pitch of the first data storage zone is substantially wider than the second data track pitch of the second data storage zone.

9. A disk drive as defined in claim 8, wherein a track-to-track spacing of the first track pitch is about two times wider than a track-to-track spacing of the second track pitch.

10. A disk drive as defined in claim 8, wherein a track-to-track spacing of the first track pitch is about 30 percent wider than a track-to-track spacing of the second track pitch.

11. A disk drive as defined in claim 8, wherein the first data storage zone includes a mobile-safe zone, the second data storage zone includes a mobile-normal zone, and the mobile device may access the mobile-normal zone and the mobile safe zone when the mobile device is in a mobile environment or when the mobile device is in a non-mobile environment.

12. A disk drive as defined in claim 11, wherein the mobile device is in a non-mobile environment when the mobile device is placed in a docking station and the mobile device is in a mobile environment when the mobile device is not placed in a docking station.

13. A disk drive as defined in claim 8, wherein:

the disk drive includes a ramp for parking an actuator arm coupled to the read/write head when the disk drive is in a spin-down mode; and the disk drive includes a mobile-low-power data storage zone that is located on the disk media surface so that an actuator current is minimized for moving the read/write head to a data track in the mobile-low-power zone upon loading of the read/write head over the disk media surface from the ramp.

14. A disk drive as defined in claim 13, wherein a distance from an outer diameter of the disk media surface to the mobile-low-power zone is between about 10 and 15 percent of a distance between the outer diameter and an inner diameter of the disk media surface.

* * * * *